(12) United States Patent
Andesson

(10) Patent No.: US 9,911,026 B2
(45) Date of Patent: Mar. 6, 2018

(54) FINGERPRINT SENSOR WITH FORCE SENSOR

(71) Applicant: Fingerprint Cards AB, Göteborg (SE)

(72) Inventor: Markus Andesson, Lomma (SE)

(73) Assignee: FINGERPRINT CARDS AB, Göteborg (SE)

(*) Notice: Subject to any disclaimer, the term of this patent is extended or adjusted under 35 U.S.C. 154(b) by 0 days.

(21) Appl. No.: 15/596,254

(22) Filed: May 16, 2017

(65) Prior Publication Data

US 2017/0344782 A1   Nov. 30, 2017

(30) Foreign Application Priority Data

May 30, 2016 (SE) ........................................ 1650750

(51) Int. Cl.
*G06K 9/00* (2006.01)
*G06F 21/32* (2013.01)

(52) U.S. Cl.
CPC ........... *G06K 9/0002* (2013.01); *G06F 21/32* (2013.01); *G06K 9/00087* (2013.01)

(58) Field of Classification Search
CPC .... G06K 9/0002; G06F 21/32; G06F 9/00087
USPC ........................................................... 726/19
See application file for complete search history.

(56) References Cited

U.S. PATENT DOCUMENTS

| | | | |
|---|---|---|---|
| 2003/0068072 A1 | 4/2003 | Hamid | |
| 2006/0078176 A1* | 4/2006 | Abiko | G06F 3/03547 382/124 |
| 2007/0047776 A1 | 3/2007 | Mizuno | |
| 2008/0115981 A1* | 5/2008 | Bechtel | G06F 3/03545 178/19.01 |
| 2008/0166028 A1 | 7/2008 | Turek et al. | |
| 2010/0027854 A1* | 2/2010 | Chatterjee | G06F 3/016 382/124 |
| 2010/0066697 A1 | 3/2010 | Jacomet et al. | |

(Continued)

OTHER PUBLICATIONS

Swedish Search Report from Swedish Application No. 1650750-1, dated Jan. 30, 2017.

*Primary Examiner* — Haresh N Patel
(74) *Attorney, Agent, or Firm* — RMCK Law Group PLC

(57) ABSTRACT

The present invention generally relates to a method for authenticating a user of an electronic device comprising a fingerprint sensor and a force sensor, the method comprising: retrieving a stored plurality of fingerprint enrollment templates comprising an enrollment representation of at least part of a user's finger and a corresponding enrollment force parameter, acquiring a first verification image of an object and determining a first verification representation, determining a first verification force parameter, performing a fingerprint authentication procedure based on the first verification template and the plurality of fingerprint enrollment templates, wherein when the first verification representation and the first verification force parameter comprised in the first verification template matches each of the enrollment representation and the enrollment force parameter comprised in the same fingerprint enrollment template providing a signal indicating successful authentication of the user. The invention also relates to a fingerprint sensing system and an electronic device.

18 Claims, 7 Drawing Sheets

(56) References Cited

U.S. PATENT DOCUMENTS

| | | | |
|---|---|---|---|
| 2011/0197270 A1* | 8/2011 | Kaufman | G06F 21/32 726/7 |
| 2011/0222740 A1* | 9/2011 | Kitane | A61B 5/6838 382/115 |
| 2012/0232761 A1* | 9/2012 | Charnesky | H01R 13/6272 701/49 |
| 2013/0320087 A1* | 12/2013 | Moran | G06K 19/06037 235/440 |
| 2014/0211036 A1* | 7/2014 | Aoki | H04N 5/2354 348/222.1 |
| 2014/0317722 A1* | 10/2014 | Tartz | G06F 3/011 726/19 |
| 2016/0078268 A1 | 3/2016 | Mankowski et al. | |
| 2017/0076132 A1* | 3/2017 | Sezan | G06K 9/00013 726/19 |

\* cited by examiner

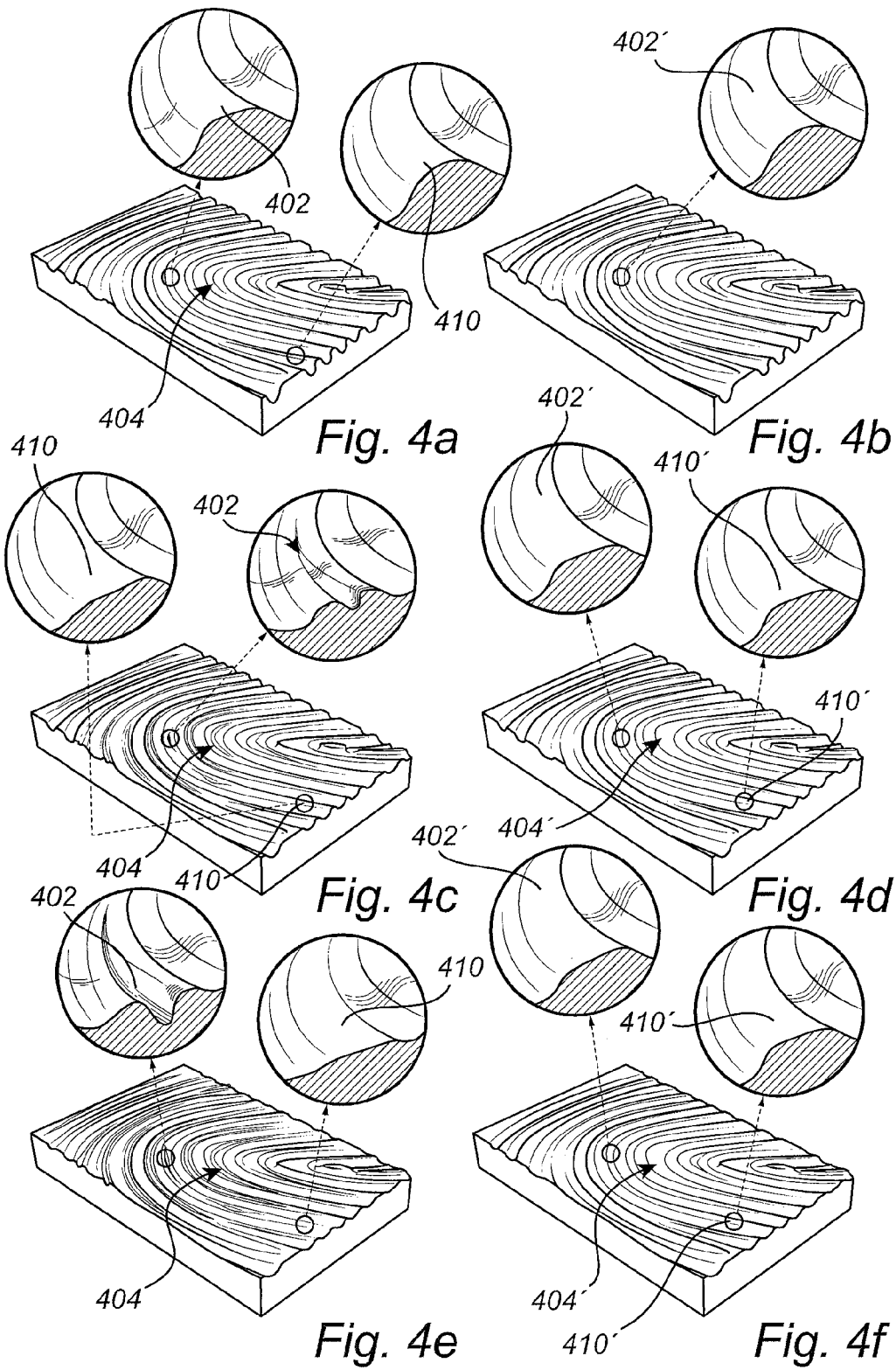

FINGERPRINT SENSOR WITH FORCE SENSOR

CROSS-REFERENCE TO RELATED APPLICATION

The present application is based on and claims the benefit of Swedish patent application Serial No. 1650750-1, filed May 30, 2016, the content of which is hereby incorporated by reference in its entirety.

TECHNICAL FIELD

The present invention generally relates to a method for authenticating a user of an electronic device comprising a fingerprint sensor and a force sensor. The present invention further generally relates to a corresponding fingerprint sensor and electronic device.

BACKGROUND OF THE INVENTION

Various types of biometric systems are used more and more in order to provide an increased security for accessing an electronic device and at the same time keep the user convenience at an acceptable level. In particular fingerprint sensors have been successfully integrated in such devices, for example, thanks to their small form factor, high performance and user acceptance. Among the various available fingerprint sensing principles (such as capacitive, optical, thermal etc.), capacitive sensing is most commonly used, in particular in applications where size and power consumption are important.

All capacitive fingerprint sensors provide an indicative measure of the capacitance between several sensing elements and a finger placed on the surface of the fingerprint sensor. Acquisition of a fingerprint image is typically performed using a fingerprint sensor comprising a plurality of sensing elements arranged in a two-dimensional manner, and a block based technique may be applied to the fingerprint sensor for acquiring a fingerprint image, where the blocks of sensing elements are sampled sequentially.

One of the problems associated with fingerprint sensors concerns so-called spoof fingers trying to mimic a live fingerprint to thereby deceive a fingerprint sensor. If fraud by the spoof finger is successful, unauthorized access to systems may undesirably be approved or unauthorized transactions may be granted which may lead to disastrous consequences. Furthermore, a spoof finger is relatively easy to produce which may eventually lead to an increasing number of fraud attempts, in particular as fingerprint sensors become more and more common as a means for authentication.

Thus, there is a need for improvement with regards the level of security related to authentication with fingerprint sensors.

SUMMARY OF THE INVENTION

In view of above-mentioned and other drawbacks of the prior art, it is an object of the present invention to provide a fingerprint sensor with improved authentication security. It is a further an object to provide a corresponding method to be implemented in a fingerprint sensor system.

According to an aspect of the present invention, it is therefore provided method for authenticating a user of an electronic device comprising a fingerprint sensor and a force sensor, the method comprising the steps of: retrieving a stored plurality of fingerprint enrolment templates of a user's finger, each fingerprint enrolment template comprising a enrolment representation of at least part of the user's finger and a corresponding enrolment force parameter indicative of the force applied by the user's finger when the enrolment representation was acquired; acquiring, using the fingerprint sensor, a first verification image of an object; determining a first verification representation from the first verification image; determining, using the force sensor, a first verification force parameter indicative of a force applied by the object on the fingerprint sensor when the first verification representation is acquired, wherein the first verification representation and the first verification force parameter forms a first verification template; performing a fingerprint authentication procedure based on the first verification template and the plurality of fingerprint enrolment templates, wherein when each of the first verification representation and the first verification force parameter comprised in the first verification template matches each of the enrolment representation and the enrolment force parameter comprised in the same fingerprint enrolment template, providing a signal indicating successful authentication of the user.

The present invention is based upon the realization that fingerprints of live fingers deform depending on the force applied on the fingerprint sensor. It is thus realized that information related to the deformation can be utilized to improve the authentication security in fingerprint sensors. At different force parameters (e.g. at different forces), the verification representation of a live fingerprint will be different and for a spoof fingerprint, the verification representation does not typically change much. For example, 3-dimensional spoof fingerprints (e.g. made from rubber, epoxy, or another material) deform insignificantly when exposed to a force (e.g. not breaking the spoof but within the boundaries for imaging). Furthermore, 2-dimensional spoofs such as photographs of photocopies do not deform (such that the spoof fingerprint deforms) at all when a force is applied on the spoof. Accordingly, the improvement in authentication is achieved by storing a force value together with the fingerprint enrolment representation in the enrolment template. In other words, the enrolment templates each comprise an enrolment force parameter and an enrolment representation. For a valid authentication, both the verification representation obtained from a verification image, and the verification force must match the enrolment representation and the enrolment force parameter in the same enrolment template.

In the context of the present application, the "enrolment representation" and/or the "verification representation" of a fingerprint image may be any information extracted from the fingerprint image, which is useful for assessing the similarity between fingerprint images acquired at different times. For instance, the enrolment/verification representation of the fingerprint image may comprise descriptions of fingerprint features (such as so-called minutiae) and information about the positional relationship between the fingerprint features. Alternatively, the representation of the fingerprint image may be the image itself, or a compressed version of the image. For example, the image may be binarized and/or skeletonized. Various ways of extracting such verification representation or enrolment representation from a fingerprint image are well-known to a person of ordinary skill in the relevant art.

In one embodiment of the invention, there is further provided, when a match is found between the first verification representation and a first enrolment representation, comparing the first verification force parameter and the first enrolment force parameter stored in the fingerprint enrolment template comprising the matching first enrolment representation, wherein, when the first verification force parameter is determined to not match the first enrolment force parameter, providing a signal indicating unsuccessful authentication of the user. In addition, it may be determined that the object is a spoof finger. For example, when it is determined that the first verification force parameter is larger than the first enrolment force parameter, it may be determined that the object is a spoof finger. Thereby, it is advantageously possible to classify the object as a spoof finger.

In another embodiment of the invention, the method may further comprise the steps of: acquiring, using the fingerprint sensor, a second verification image of the object when a second force is applied by the object on the fingerprint sensor, the second force being different from the first force; determining a second verification representation from the second verification image; when the first verification representation is determined to match the first enrolment representation and the determined first verification force parameter is determined to match the first enrolment force parameter, matching the second verification representation with the first verification representation; and providing a signal indicating successful authentication of the user based on a degree of deviation of the second verification representation compared to the first verification representation.

If the degree of deviation between the first and the second verification representation is considered "high", it may be determined that the object is a live finger, and provided that the first verification representation is determined to match the first enrolment representation and the determined first verification force parameter is determined to match the first enrolment force parameter, successful authentication may be provided. However, if the degree of deviation is determined to be "low", it may be determined that the object is a spoof finger and the authentication is thus unsuccessful. The deviation may be determined from deformations of ridges, such as increase in width or depth, or split of ridges. For example, if no deformations are found, the object is determined to be a spoof finger, thus in that case the degree of deformation is considered "low". If ridges split, the degree of deformation may be determined to be "high" and the object is determined to be a live finger. Furthermore, a deviation may be determined from the appearance of a pore in the fingerprint image. For example, for a known user, the pores are located in known places on the finger, and when a pressure is applied the pores tend to widen and stand out more clearly. Thus, the appearance of a widened pore may be determined as a "high" degree of deviation. In a spoof, it is difficult, or impossible to correctly include pores corresponding to a known finger fingerprint. With this embodiment, the authentication security is advantageously increased further. The second verification image may be acquired either after prompting the user to apply a different force or automatically when the user naturally applies a different force on the fingerprint sensor during verification.

According to one embodiment of the invention, the step of performing a fingerprint authentication procedure based on the first verification template and the plurality of fingerprint enrolment templates may comprise: matching the first verification force parameter with the plurality of fingerprint enrolment templates, wherein when the first verification force parameter matches a first enrolment force parameter of the fingerprint enrolment templates, matching the first verification representation with the enrolment representations of the fingerprint enrolment templates comprising the first enrolment force parameter. In other words, first the verification force parameter is matched with enrolment force parameters, when a match is found; it may be that several enrolment representations were enrolled at the same enrolment force parameter. This may be the case for example when different partial fingerprint images of the fingerprint are acquired for enrollment. The verification representation only needs to be compared with the enrolment representations acquired at the enrolment representation matching the verification force parameter. In other words, the authentication procedure can be performed significantly faster compared to if the first verification representation has to be compared to all of the enrolled representations.

In one embodiment of the invention, the method may comprise the steps of: acquiring, using the fingerprint sensor, a second verification image of the object when a second force is applied by the object on the fingerprint sensor; determining a second verification representation from the second verification image; determining, using the force sensor, a second verification force parameter indicative of the second force applied by the object on the fingerprint sensor when the second verification image is acquired, wherein the second verification representation and the second verification force parameter forms a second verification template; performing the fingerprint authentication procedure based on the first verification template, the second verification template, and the plurality of fingerprint enrolment templates, wherein when each of the first verification representation and the first verification parameter comprised in the first verification template matches each of the enrolment representation and the enrolment force parameter comprised in the same first fingerprint enrolment template, matching the second verification template with the plurality of fingerprint enrolment templates, wherein when each of the second verification representation and the second verification parameter comprised in the second verification template matches each of a second enrolment representation and a second enrolment force parameter comprised in the same second fingerprint enrolment template, providing a signal indicating successful authentication of the user. Thus, even further increased level of authentication is provided by comparing more than one verification representation and verification force parameter to the plurality of enrolment templates. The second verification image and the second verification force parameter may be acquired either after prompting the user to apply a different force or automatically when the user naturally applies a different force on the fingerprint sensor during verification.

During acquisition of second verification images, the force sensor may continuously measure the force applied on the fingerprint sensor. If the measured force suddenly drops to zero or close to zero or makes a sudden alteration in force between acquisitions of the first and the second verification images, a signal may be provided to start the acquisition of verification images from the beginning. This way, it may be avoided that a spoof finger fingerprint is replaced to mimic the change in a living finger fingerprint due to different force applied. In a same way, the fingerprint sensor may monitor the fingerprint image and, it the image suddenly disappears a signal may be provided to start the acquisition of verification images from the beginning.

In one embodiment there may be implemented, when a signal indicating unsuccessful authentication of the user is provided, locking the electronic device. Thus, the electronic device is locked so that the electronic device can not be accessed by a spoof finger.

According to another embodiment of the invention, the method may further comprise the step of: when a signal indicating unsuccessful authentication of the user is provided, locking the electronic device, notifying, via electronic communication means, the owner of the electronic device that a spoof is attempting to access the electronic device if it is determined that the object is a spoof finger. This way, an owner of the device may be notified of a fraud attempt to access the electronic device so that the owner can take action. The electronic communication means may for example be e-mail, SMS to another predefined phone number, or any internet based messaging service. The owner may be the person who is a registered user of the electronic device. For example, if the electronic device is a mobile phone with email communication means, the account registered on the electronic device may be considered to be a reference to the owner. Furthermore, the owner may be required to enter additional contact information in the electronic device which is used in case of an unsuccessful authentication caused by a spoof finger attempt to unlock the electronic device.

According to another embodiment of the invention, when a signal is provided indicating successful authentication of the user, unlocking the electronic device. Thus, the electronic device may be accessed if a successful authentication is indicated.

According to a second aspect there is provided a fingerprint sensing system comprising a force sensor and a fingerprint sensor, the fingerprint sensing system being configured to: retrieve a stored plurality of fingerprint enrolment templates of a user's finger, each fingerprint enrolment template comprising a enrolment representation of at least part of the user's finger and a corresponding enrolment force parameter indicative of the force applied by the user's finger when the enrolment representation was acquired; acquire, using the fingerprint sensor, a first verification image of an object; determine a first verification representation from the first verification image; determine, using the force sensor, a first verification force parameter indicative of a force applied by the object on the fingerprint sensor when the first verification representation is acquired, wherein the first verification representation and the first verification force parameter forms a first verification template; perform a fingerprint authentication procedure based on the first verification template and the plurality of fingerprint enrolment templates, wherein when each of the first verification representation and the first verification force parameter comprised in the verification template matches each of the enrolment representation and the enrolment force parameter comprised in the same fingerprint enrolment template, providing a signal indicating successful authentication of the user.

This aspect of the invention provides similar advantages as discussed above in relation to the previous aspect of the invention.

According to another aspect of the present invention, there is provided an electronic device comprising a control unit and a fingerprint sensing system according to the previous aspect.

Accordingly, the fingerprint sensing system preferably forms part of an electronic device further comprising a control unit for performing an authentication of the finger based on the acquired verification fingerprint image and verification force parameter, and performing at least one action only if the authentication indicates an authentication success. Such an action may for example be for unlocking a locked portable device, e.g. in case the portable device is a mobile phone. The at least one action may of course be any type of action suitably used when there is a need to authenticate a finger.

In one embodiment of the invention, the control unit may be configured to, when a match is found between the first verification representation and a first enrolment representation, compare the first verification force parameter and the first enrolment force parameter stored in the fingerprint enrolment template comprising the matching first enrolment representation, wherein, when the first verification force parameter is determined to not match the first enrolment force parameter, lock the electronic device so that the electronic device can not be accessed.

In one embodiment of the invention, the control unit may be configured to notify, via electronic communication means, the owner of the electronic device that a spoof is attempting to access the electronic device when the electronic device is locked.

In another embodiment of the invention, the control unit may be configured to unlock the electronic device in response to the signal indicating successful authentication of the user.

This aspect of the invention provides similar advantages as discussed above in relation to the previous aspect of the invention.

The fingerprint sensor may be implemented using any kind of current or future fingerprint sensing principle, including for example capacitive, optical, or thermal sensing technology. However, at present capacitive sensing is most preferred. With a capacitive fingerprint sensor, a measure is detected indicative of the capacitive coupling between each sensing element in an array of sensing elements and a finger surface touching the fingerprint sensor surface. Sensing elements at locations corresponding to ridges in the fingerprint will exhibit a stronger capacitive coupling to the finger than sensing elements at locations corresponding to valleys in the fingerprint. Both one and two-dimensional sensors are possible and within the scope of the invention. Furthermore, the electronic device may advantageously be a mobile phone. However, other electronic devices are of course thinkable such as tablets, laptops desktop computers, etc.

Within the context of the invention, the expression "fingerprint image" should be interpreted broadly and to include both a regular "visual image" of a fingerprint of a finger as well as a set of measurements relating to the finger when acquired using the fingerprint sensor. In addition, the expression "control unit" should be understood to include any type of computing device, such as an ASIC, a microprocessor, etc. It should also be understood that the actual implementation of such a control unit may be divided between a plurality of devices/circuits.

According to a further aspect of the present invention, there is provided a computer program product comprising a computer readable medium having stored thereon computer program means for controlling an electronic device, the electronic device comprising a control unit, a fingerprint sensor, and a force sensor, wherein the computer program product comprises: code for retrieving a stored plurality of fingerprint enrolment templates of a user's finger, each fingerprint enrolment template comprising a enrolment representation of at least part of the user's finger and a corresponding enrolment force parameter indicative of the force applied by the user's finger when the enrolment representation was acquired; code for acquiring, using the fingerprint sensor, a first verification representation of an object; code for determining a first verification representation from the first verification image; code for determining, using the force sensor, a first verification force parameter indicative of a force applied by the object on the fingerprint sensor when the first verification representation is acquired, wherein the first verification representation and the first verification force parameter forms a first verification template; code for performing a fingerprint authentication procedure based on the first verification template and the plurality of fingerprint enrolment templates, and code for providing a signal indicating successful authentication of the user when each of the first verification representation and the first verification force parameter comprised in the verification template matches each of the enrolment representation and the enrolment force parameter comprised in the same fingerprint enrolment template.

In summary, the present invention generally relates to a method for authenticating a user of an electronic device comprising a fingerprint sensor and a force sensor, the method comprising: retrieving a stored plurality of fingerprint enrolment templates comprising an enrolment representation of at least part of a user's finger and a corresponding enrolment force parameter, acquiring a first verification image of an object and determining a first verification representation, determining a first verification force parameter, performing a fingerprint authentication procedure based on the first verification template and the plurality of fingerprint enrolment templates, wherein when the first verification representation and the first verification force parameter comprised in the first verification template matches each of the enrolment representation and the enrolment force parameter comprised in the same fingerprint enrolment template providing a signal indicating successful authentication of the user. The invention also relates to a fingerprint sensing system and an electronic device.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which:

FIGS. 4a-4f conceptually show fingerprint images acquired from a live finger (FIGS. 4a, c, e) and from a spoof finger (FIGS. 4b, d, f), at different applied pressure/force on the fingerprint sensor;

DETAILED DESCRIPTION

Figure 1:
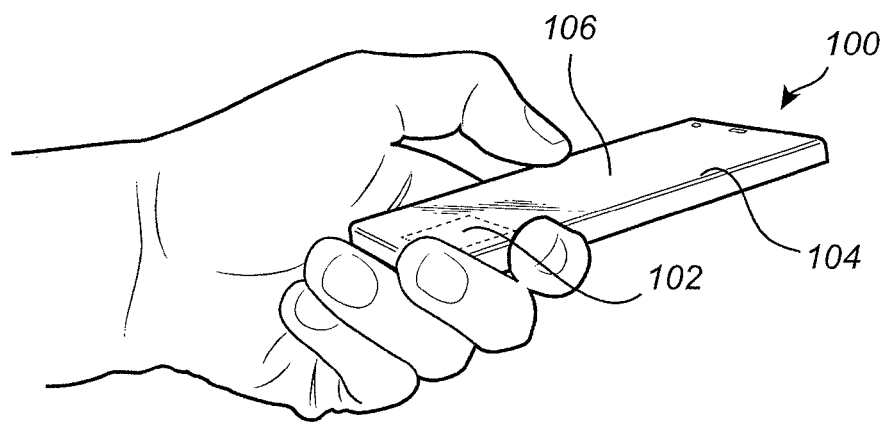
FIG. 1 schematically exemplify an electronic device according to the present invention, in the form of a mobile phone comprising an integrated fingerprint sensor.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person. Like reference characters refer to like elements throughout.

Turning now to the drawings and to FIG. 1 in particular, there is schematically illustrated the electronic device according to the present invention, in the form of a mobile phone 100 with an integrated fingerprint sensor 102 and a display unit 104 with a touch screen interface 106. In this embodiment the fingerprint sensor 102 and the display unit 104 are together arranged at the front side of the mobile phone 100. The fingerprint sensor 102 may, for example, be used for unlocking the mobile phone 100 and/or for authorizing transactions carried out using the mobile phone 100, etc. The fingerprint sensor 102 may of course also be placed on the backside of the mobile phone 100. The fingerprint sensor 102 is part of a fingerprint sensing system comprising a force sensor (not shown).

Preferably and as is apparent for the skilled person, the mobile phone 100 shown in FIG. 1 further comprises a first antenna for WLAN/Wi-Fi communication, a second antenna for telecommunication communication, a microphone, a speaker, and a phone control unit. Further hardware elements are of course possibly comprised with the mobile phone. It should furthermore be noted that the invention may be applicable in relation to any other type of portable electronic device, such as a laptop, a remote control, a tablet computer, or any other type of present or future similarly configured device.

Figure 2:
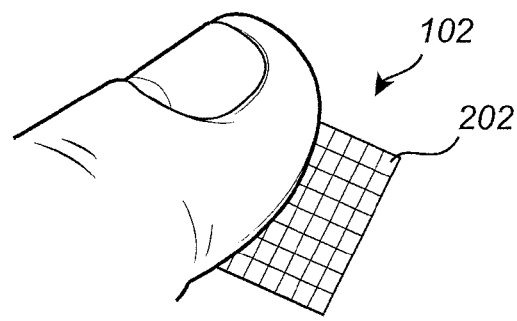
FIG. 2 schematically shows the fingerprint sensor array comprised in the electronic device in FIG. 1.

With reference to FIG. 2, there is conceptually illustrated a somewhat enlarged view of the fingerprint sensor 102. In the case of employing a capacitive sensing technology, the fingerprint sensor 102 is configured to comprise a large plurality of sensing elements, preferably arranged as a two-dimensional array. The two-dimensional array may have sizes depending on the planned implementation and in an embodiment 160×160 pixels are used. Other sizes are of course possible and within the scope of the invention, including two-dimensional array with less pixels as compared to the above example. A single sensing element (also denoted as a pixel) is in FIG. 2 indicated by reference numeral 202.

Figure 3A:
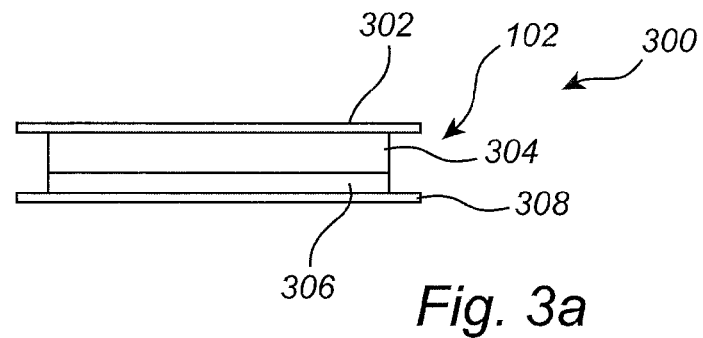
FIGS. 3a-3b schematically show a cross-section of a fingerprint sensing system according to an embodiment of the invention.
Figure 3B:
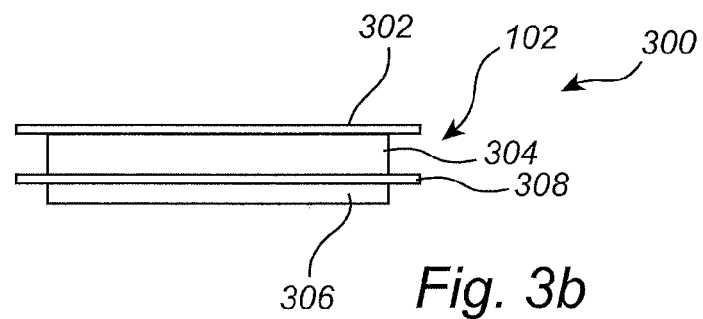

In FIG. 3a-b, there is schematically shown cross-sections of a fingerprint sensing system 300 comprising a fingerprint sensor 102 and a force sensor 306. The fingerprint sensor 102 comprising a top surface 302 with the sensing elements (not shown here, see number 202 in FIG. 2) and a fingerprint sensor die 304. As shown in FIG. 3a, the force sensor 306 may be arranged under the fingerprint sensor die 304 on a substrate 308, in other words, the force sensor 306 is interleaved between the fingerprint sensor die 304 and the substrate 308. Alternatively, as is shown in FIG. 3b, the force sensor 306 may be arranged under the substrate 308. The force sensor may for example be a resistive force sensor known in the art although other types of force sensor may also be used, such as optical sensors. Such a resistive force sensor may for example comprise a material (e.g. polymer)

or structure whose resistance changes depending on the force applied to the material or structure.

Figure 3C:
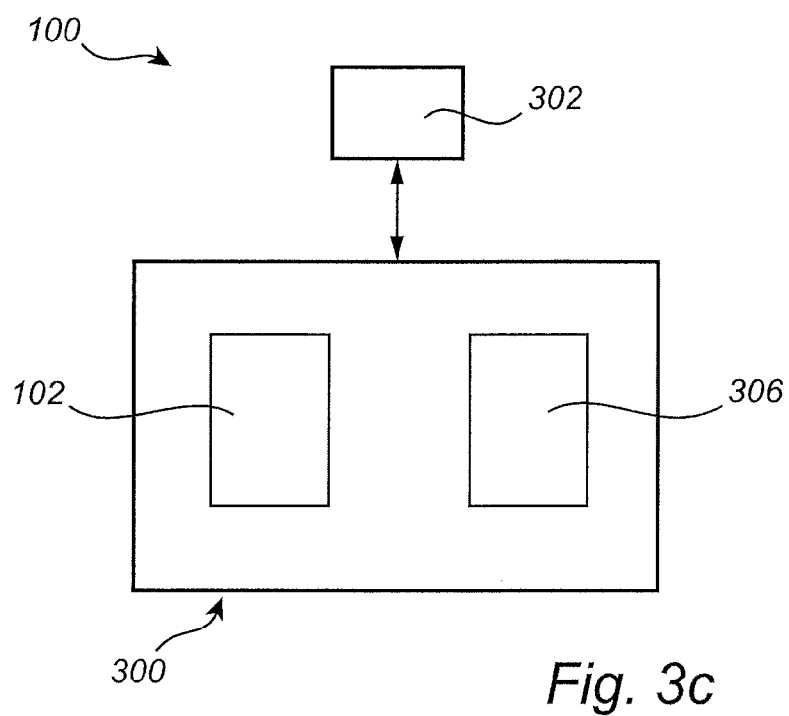
FIG. 3c conceptually show a fingerprint sensing system according to an embodiment of the invention.

FIG. 3c schematically illustrates an electronic device 100 comprising a control unit 302 arranged to communicate with the fingerprint sensing system 300. In this particular embodiment, the control unit 302 is not part of the fingerprint sensing system 300 but is a control unit 302 integrated in the electronic device 100. However, likewise the control unit can be integrated with the fingerprint sensing system 300. The control unit 302 is configured to control the fingerprint sensor 102 to acquire fingerprint images and to control the force sensor 306 to acquire a force parameter. The force parameters and the fingerprint images is thus acquired and read by the control unit 302. The force sensor 306 may be part of a fingerprint sensor package, i.e. integrated in the package, or it may also be arranged under the fingerprint sensor package. This was described further with reference to FIG. 3a-b. Furthermore, the control unit may provide signals to control circuitry of the electronic device for unlocking of locking the electronic device to thereby allow access or not to the electronic device depending on the outcome of an authentication procedure. The control unit 302 may comprise sensing circuitry for sensing current from the force sensor.

The control unit may include circuitry for converting analog signals to digital signals. Such circuitry may include at least one analog to digital converter circuit. In such embodiments, the fingerprint sensing system may thus provide a fingerprint pattern signal as a digital signal and a force parameter signal as a digital signal. In other embodiments, the fingerprint pattern signal and the force parameter signal may be provided as an analog signal. The force sensor may provide an analog signal indicative of the force applied on the sensor, the signal may thus be converted into a digital signal by the analog to digital converter circuit and provided to the control unit via e.g. SPI (Serial Peripheral Interface) or similar (e.g. USB).

FIG. 4a-f conceptually shows fingerprint topologies from a living finger (FIGS. 4a, c, e) and from a spoof finger (FIGS. 4b, d, f), at different applied pressure/force on the fingerprint sensor. Generally, a spoof finger is intended to mimic the fingerprint of the living finger. FIG. 4a shows a fingerprint topology of a living finger at "low" pressure applied on the fingerprint sensor and FIG. 4b shows the topology of the spoof finger when the same or similar "low" pressure is applied by the spoof finger on the fingerprint sensor. The fingerprint topology in FIG. 4a is similar to the spoof finger fingerprint in FIG. 4b. In FIG. 4a there is indicated a ridge 402 and a ridge 410 in close-up views. In FIG. 4b there is indicated a ridge 402' in the spoof fingerprint corresponding to the ridge 402 in the live fingerprint in FIG. 4a.

Turning now to FIGS. 4c-d, there is shown a living finger fingerprint image in FIG. 4c at "normal" pressure (e.g. about 0.3 N-0.8 N) applied on the fingerprint sensor and in FIG. 4d there is shown a spoof finger fingerprint topology acquired by the fingerprint sensor at the same or similar "normal" pressure. The difference between the spoof finger fingerprint topology in FIG. 4b and the spoof finger fingerprint topology in FIG. 4d is not substantial, or even close to non-existing. In the living finger fingerprint images shown in FIG. 4a and FIG. 4c, however there is some difference in the topologies. For example, as shown in FIG. 4c, two ridges 402, 404 in the living finger fingerprint are somewhat split as compared to the same ridges 402, 404 in FIG. 4a (only ridge 402 shown in expanded view). Thus, depending on the force applied on the fingerprint sensor when the fingerprint image was acquired, the fingerprint image is different, thereby also the fingerprint verification representation. Furthermore, as previously mentioned, the difference in the spoof finger fingerprint images (FIG. 4b and FIG. 4d) does not correspond to the difference between the live finger fingerprint topologies (FIG. 4a and FIG. 4c). For example, the ridges 402' and 404' have not split when the "normal" pressure is applied as compared to when the "low" pressure is applied (FIG. 4b). Therefore, it is possible to determine a difference in the live finger fingerprint topology shown in FIG. 4c and the spoof finger fingerprint topology shown in FIG. 4d, both at the same "normal" pressure applied on the fingerprint sensor, by comparing e.g. the live finger fingerprint ridges 402, 404 with the spoof finger fingerprint ridges 402', 404'.

Turning now to FIGS. 4e-f, there is shown a live finger fingerprint topology in FIG. 4e at "high" pressure applied on the fingerprint sensor and in FIG. 4f there is shown a spoof finger fingerprint topology acquired by the fingerprint sensor at the same or similar "high" pressure. Firstly, comparing the ridges 402, 404 from FIG. 4c acquired at the "normal" pressure which is lower than the "high" pressure, the ridges 402, 404 have split further (a split may be due to presence of a pore). As a further example, there can be noticed a deformation (e.g. a compression) of the ridge 410 in FIG. 4e ("high" pressure) compared to the same ridge 410 in FIG. 4c ("normal" pressure) and in FIG. 4a ("low" pressure). Secondly, comparing the ridges 402', 404' of the spoof finger fingerprint in FIG. 4f at "high" pressure with the same ridges 402', 404', of the spoof finger fingerprint in FIG. 4d at "normal" pressure, there is no deformation or close to no deformation. In particular there is no splitting of the ridges 402', 404', in the spoof finger fingerprint image acquired at "high" pressure. Furthermore, the ridge 410' in FIG. 4f, does not change significantly depending on the applied pressure/force going from "normal" pressure (FIG. 4d) to "high" pressure (FIG. 4f). However, the deformation of the corresponding ridge 410 is substantially deformed (i.e. compressed) in the live fingerprint going from "normal" pressure (FIG. 4c) to "high" pressure (FIG. 4e).

Figure 5:
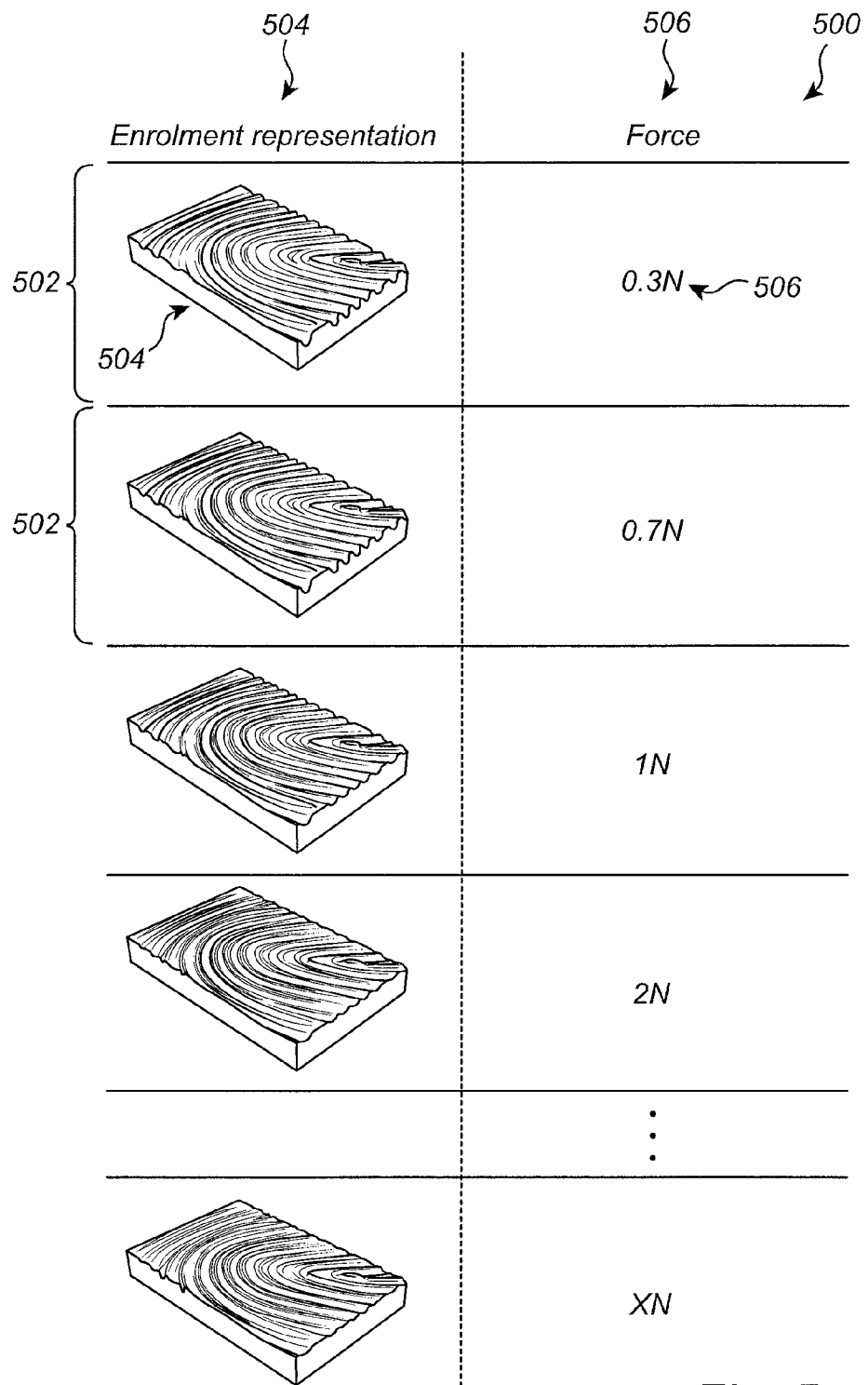
FIG. 5 conceptually illustrates fingerprint enrolment templates.

FIG. 5 conceptually illustrates a plurality of fingerprint enrolment templates 500 according to embodiments of the invention. A single fingerprint enrolment template is denoted 502 (not all are numbered). Each fingerprint enrolment template 502 comprises an enrolment representation 504 of a user's finger and an enrolment force parameter 506 indicative of the force applied by the user's finger when the corresponding enrolment representation 504 was acquired. The enrolment representation as shown in FIG. 5 is a conceptual view and not the actual enrolment representation.

It should be noted that although the plurality of fingerprint enrolment templates 500 in FIG. 5 are shown as a single two column table, there may be multiple enrolment representations for a single force. For example, there may be enrolment representations from different areas of the user's finger which have been enrolled with the same force. Or there may be different types of enrolment representations for a single force, e.g. different minutiae, or binarized and/or skeletonized images. It may be advantageous to first determine the verification force parameter indicative of a force applied by the object on the fingerprint sensor. Thereafter, based on the determined verification force parameter, choose the correct subset of enrolment representations corresponding to the determined force parameter. Acquiring, a first verification image of the object and determine a first verification representation from the first verification image. For fingerprint authentication, the first verification representation now only has to be matched with the subset of enrolment representations corresponding to the verification force parameter. In other words, the authentication procedure can be performed significantly faster compared to if the first verification representation has to be compared to all of the enrolled representations. For example, if the verification force parameter is 2N, then the control unit matches the verification representation with enrolment representations having been enrolled at 0.7 N, i.e. enrolment representations with a respective enrolment force parameter of 0.7 N.

Figure 6:
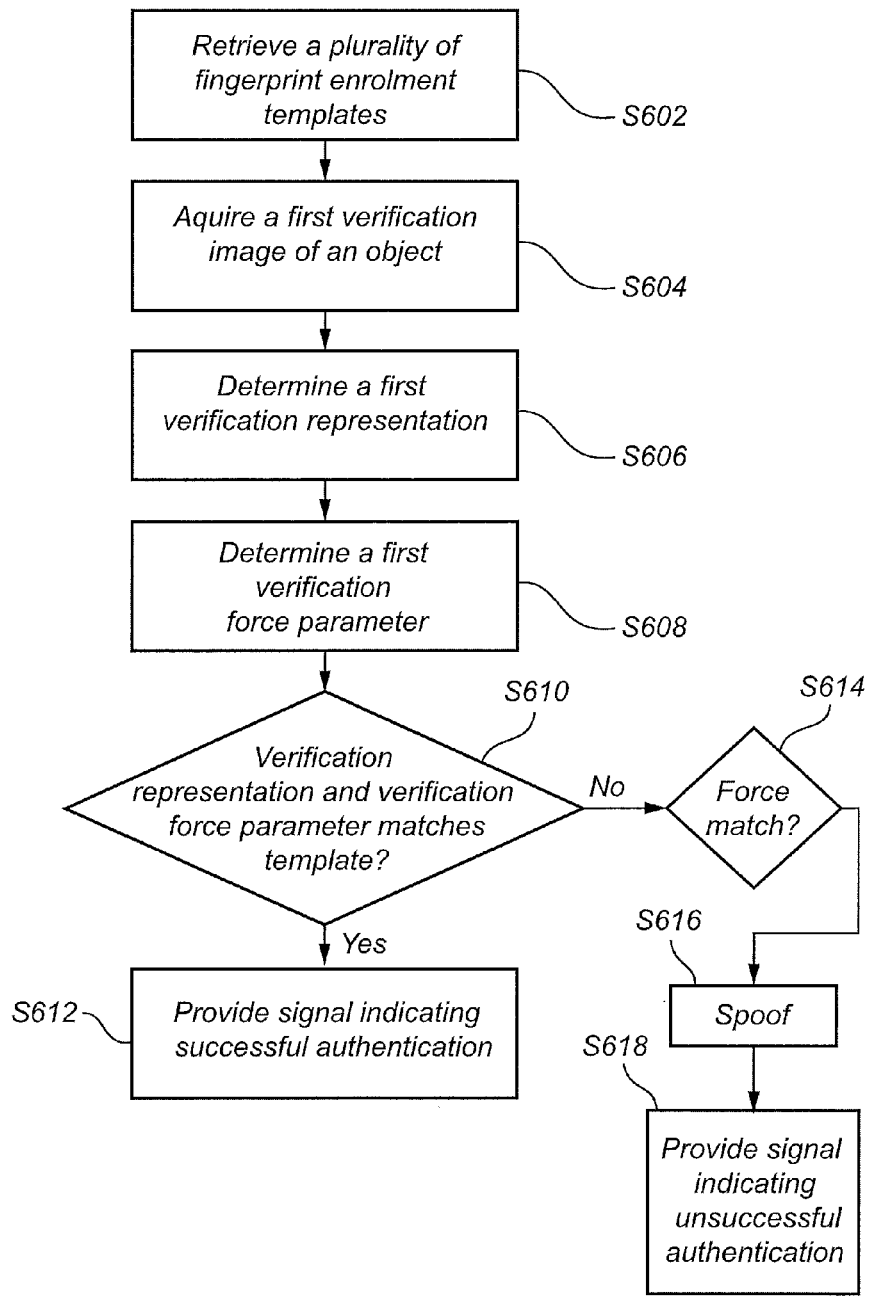
FIG. 6 is a flow-chart of method steps according to an embodiment of the invention.

Now with reference to FIG. 6 showing a flow-chart of method steps according to an embodiment of the invention. In a first step S602, a plurality of fingerprint enrolment templates are retrieved. Each enrolment template comprises a verification representation of at least a part of a user's finger and an enrolment force parameter indicative of the force applied (e.g. 1 N, 2 N, etc) when the respective enrolment representation was acquired (or when the enrolment image was acquired from which the enrolment representation was determined). In a subsequent step S604, a first verification image of an object is acquired. The verification image is acquired by the fingerprint sensor. Next, in step, S606 a first verification representation is determined from the verification image, by means known to the person skilled in the art. Furthermore, a verification force parameter is determined in step S608 indicative of the force applied by the object on the fingerprint sensor when the first verification image was acquired. Next, S610, during a fingerprint authentication procedure, it is determined whether each of the first verification representation and the first verification force parameter comprised in the verification template matches each of the enrolment representation and the enrolment force parameter comprised in the same fingerprint enrolment template. If there is match, a signal is provided S612 indicating successful authentication of the user. In one embodiment, the electronic device is unlocked when a signal is provided indicating successful authentication of the user.

In another embodiment, still with reference to FIG. 6, when a match is found between the first verification representation and a first enrolment representation but it is determined S614 that the first verification force parameter does not match the first enrolment force parameter, it is determined that the object is a spoof finger S616 and a signal is provided S618 indicating unsuccessful authentication of the user. In such case an owner of the electronic device which the object is trying to access may be notified via electronic means of a fraud attempt to access the electronic device.

Figure 7:
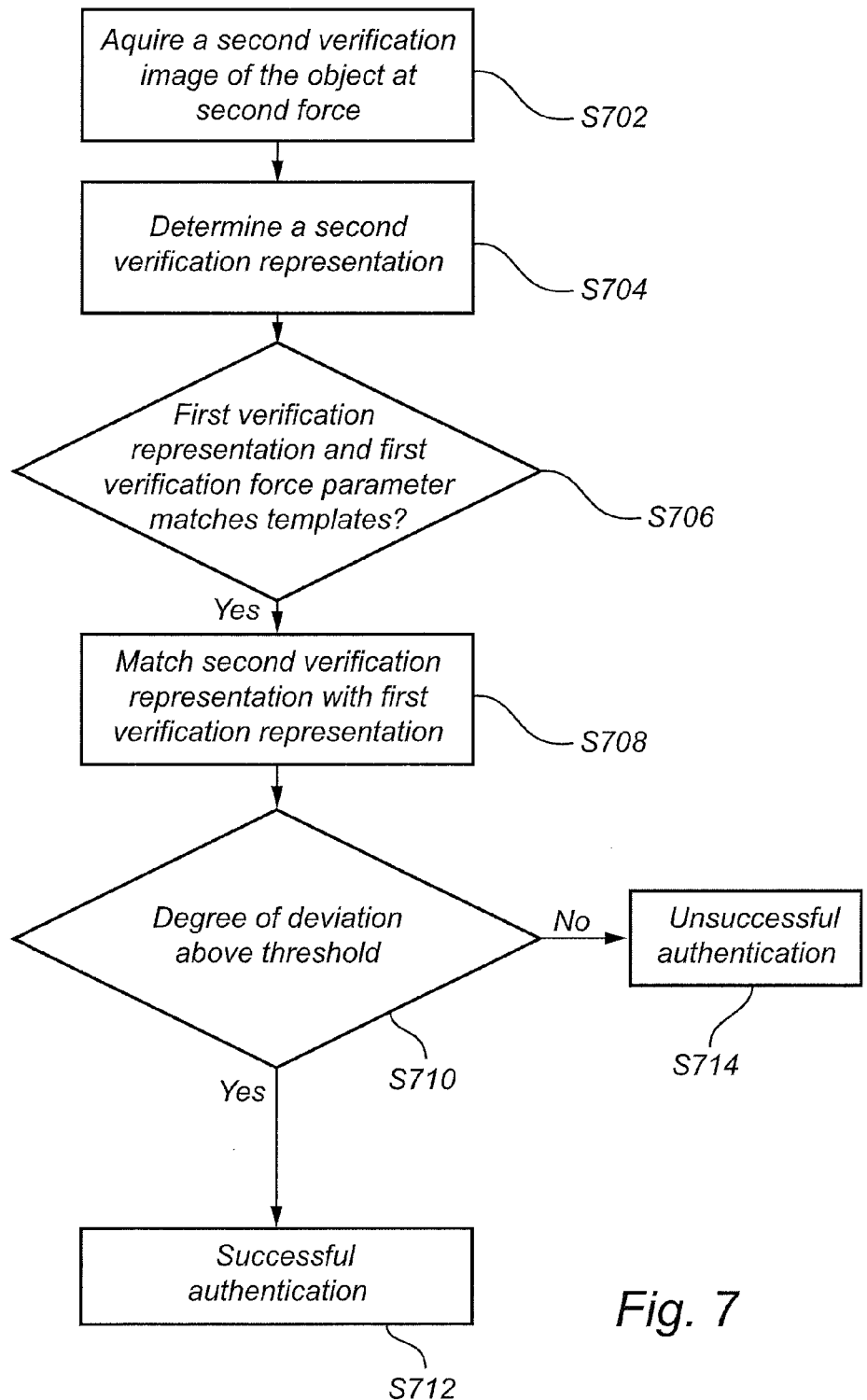
FIG. 7 is a flow-chart of method steps according to an embodiment of the invention.

Now with reference to FIG. 7 showing a flow-chart with method steps according to an embodiment of the invention. This embodiment comprises the steps S602 to S608 already described with reference to FIG. 6. In addition to the preciously described steps S602 to S608 (not shown in FIG. 7), in step S702, a second verification image of the object is acquired when a second force is applied by the object on the fingerprint sensor. The second force is different from the first force i.e. the second force is not equal to the first force. The second verification image may for example be acquired when the object is pressed on the fingerprint sensor. When the object is pressed on the fingerprint sensor it is naturally pressed with a varying force. Alternatively, the user may be prompted to apply a second force. A second verification representation is determined S704 from the second verification image. Next, if it is determined S706 that the first verification representation and the determined first verification force parameter match the first enrolment representation and the first enrolment force parameter, the second verification representation is matched S708 with the first verification representation. If there was no match in step S706, steps S614-S618 described with reference to FIG. 6 may be initiated. Based on the result of the matching in step S708, it is determined S710 if a degree of deviation between the first verification representation and the second verification representation exceeds a threshold. If the deviation exceeds the threshold a signal is provided S712 indicating successful authentication, and if the deviation does not exceed the threshold a signal is provided indicating unsuccessful authentication S714 of the user.

If the degree of deviation between the first and the second verification representation is considered "high", it may be determined that the object is a live finger, and provided that the first verification representation is determined to match the first enrolment representation and the determined first verification force parameter is determined to match the first enrolment force parameter, successful authentication may be provided. However, if the degree of deviation is determined to be "low", it may be determined that the object is a spoof finger and the authentication is thus unsuccessful. The deviation may be determined from deformations of ridges, such as increase in width or depth, or split of ridges. For example, if no deformations are found, the object is determined to be a spoof finger, thus in that case the degree of deformation is considered "low". If ridges split, the degree of deformation may be determined to be "high" and the object is determined to be a live finger. Furthermore, a deviation may be determined from the appearance of a pore in the fingerprint image. For example, for a known user, the pores are located in known places on the finger, and when a pressure is applied the pores tend to widen and stand out more clearly. Thus, the appearance of a widened pore may be determined as a "high" degree of deviation. In a spoof, it is difficult, or impossible to correctly include pores corresponding to a known finger fingerprint. With this embodiment, the authentication security is advantageously increased further. The second verification image may be acquired either after prompting the user to apply a different force or automatically when the user naturally applies a different force on the fingerprint sensor during verification.

Figure 8:
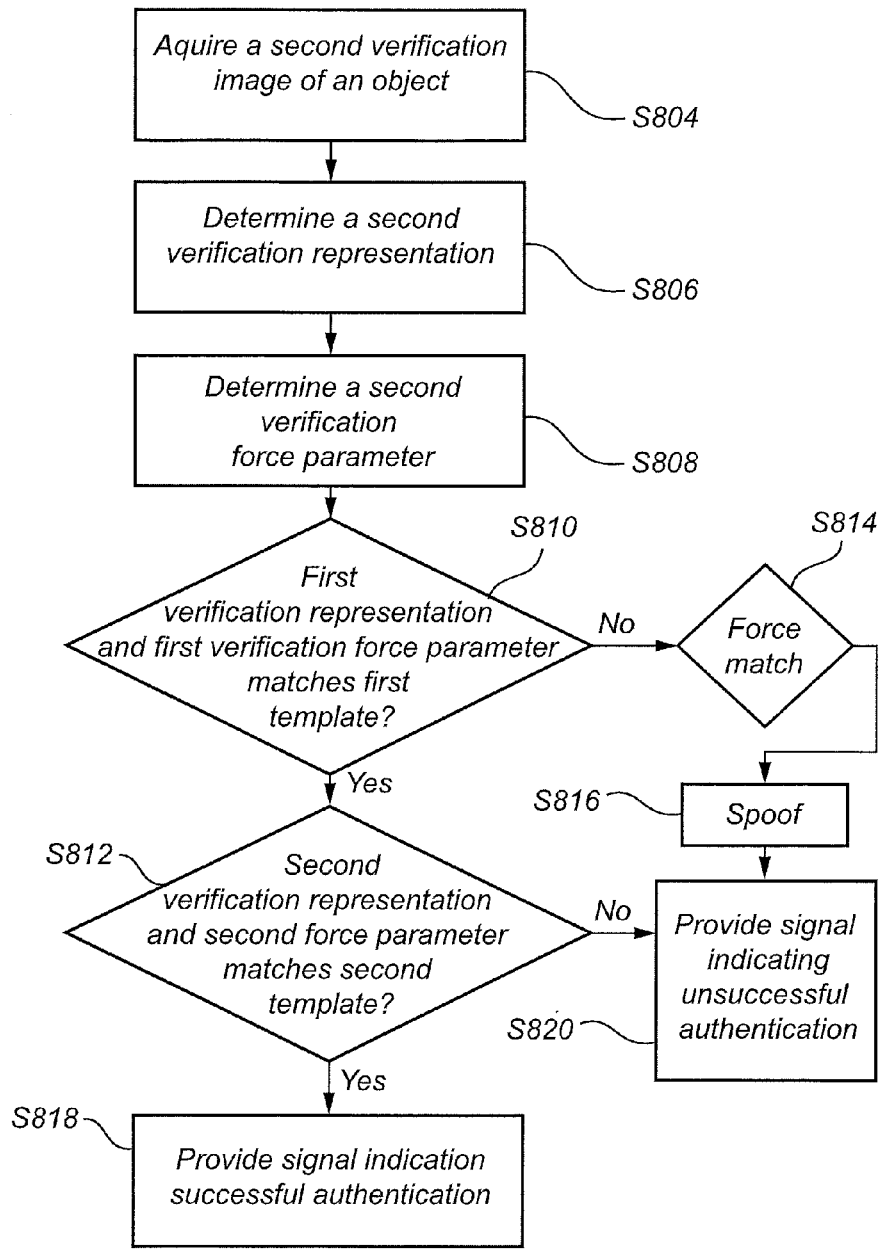
FIG. 8 is a flow-chart of method steps according to an embodiment of the invention.

FIG. 8 is a flow-chart with method steps according to another embodiment of the invention. In addition to the steps S602 to S608 described with reference to FIG. 6 (not shown in FIG. 8), there are further steps for acquiring a second verification image and a second verification force parameter. Accordingly, in step S804, a second verification image of the object is acquired when a second force is applied by the object on the fingerprint sensor. The second force is preferably different from the first force. From the second verification image a second verification representation is determined S806. Subsequently S808, a second verification force parameter indicative of the second force applied by the object on the fingerprint sensor when the second verification image is acquired is determined. The second verification representation and the second verification force parameter forms a second verification template. Next a fingerprint authentication procedure based on the first verification template, the second verification template, and the plurality of fingerprint enrolment templates is performed, whereby in step S810 it is determined whether each of the first verification representation and the first verification parameter comprised in the first verification template matches each of the enrolment representation and the enrolment force parameter comprised in the same first fingerprint enrolment template. If the result is positive in step S810, the second verification template is matched S812 with the plurality of fingerprint enrolment templates. A signal indicating successful authentication of the user is provided S818 if the second verification representation and the second verification parameter comprised in the second verification template matches each of a second enrolment representation and a second enrolment force parameter comprised in the same second fingerprint enrolment template. If no match is found in step S812, a signal indicating unsuccessful authentication is provided S820. As an optional step in this embodiment, if the verification representation matches an enrolment representation but the verification force parameter does not match S814 the enrolment force parameter in the same template, then it may be determined that the object is a spoof finger S816. In such case, no access is granted to the electronic device and the electronic device may be locked, thus unsuccessful authentication S820.

In summary, in FIG. 8 the requirement for successful authentication is that a first verification representation and a first verification force matches the same first enrolment template and that a second verification representation and a second verification force matches the same second enrolment template, the second enrolment template being different from the first enrolment template.

The control unit may each include a microprocessor, microcontroller, programmable digital signal processor or another programmable device. The control unit may also, or instead, each include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device. It should be understood that all or some parts of the functionality provided by means of the control unit (or generally discussed as "control circuitry") may be at least partly integrated with the fingerprint sensor, or may be part of the electronic device.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

In addition, variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method for authenticating a user of an electronic device comprising a fingerprint sensor and a force sensor, said method comprising the steps of:

retrieving a stored plurality of fingerprint enrolment templates of a user's finger, each fingerprint enrolment template comprising a enrolment representation of at least part of the user's finger and a corresponding enrolment force parameter indicative of the force applied by the user's finger when said enrolment representation was acquired;

acquiring, using the fingerprint sensor, a first verification image of an object;

determining a first verification representation from said first verification image;

determining, using the force sensor, a first verification force parameter indicative of a force applied by the object on the fingerprint sensor when the first verification representation is acquired, wherein the first verification representation and the first verification force parameter forms a first verification template;

performing a fingerprint authentication procedure based on the first verification template and the plurality of fingerprint enrolment templates, wherein when the first verification representation and the first verification force parameter comprised in the first verification template matches a respective enrolment representation and enrolment force parameter comprised in the same fingerprint enrolment template, providing a signal indicating successful authentication of the user, when a match is found between the first verification representation and a first enrolment representation, comparing the first verification force parameter and the first enrolment force parameter stored in the fingerprint enrolment template comprising the matching first enrolment representation, wherein, when the first verification force parameter is determined to not match the first enrolment force parameter, providing a signal indicating unsuccessful authentication of the user.

2. The method according to claim 1, further comprising the step of:

when a signal indicating unsuccessful authentication of the user is provided, locking the electronic device.

3. The method according to claim 1, further comprising the step of:
when a signal indicating unsuccessful authentication of the user is provided, locking the electronic device, notifying, via electronic communication means, an owner of the electronic device that a spoof is attempting to access the electronic device when it is determined that the object is a spoof finger.

4. The method according to claim 1, further comprising the step of:
when a signal is provided indicating successful authentication of the user, unlocking the electronic device.

5. A method for authenticating a user of an electronic device comprising a fingerprint sensor and a force sensor, said method comprising the steps of:
retrieving a stored plurality of fingerprint enrolment templates of a user's finger, each fingerprint enrolment template comprising a enrolment representation of at least part of the user's finger and a corresponding enrolment force parameter indicative of the force applied by the user's finger when said enrolment representation was acquired;
acquiring, using the fingerprint sensor, a first verification image of an object;
determining a first verification representation from said first verification image;
acquiring, using the fingerprint sensor, a second verification image of the object when a second force is applied by the object on the fingerprint sensor, the second force being different from the first force;
determining a second verification representation from said second verification image;
determining, using the force sensor, a first verification force parameter indicative of a force applied by the object on the fingerprint sensor when the first verification representation is acquired, wherein the first verification representation and the first verification force parameter forms a first verification template;
performing a fingerprint authentication procedure based on the first verification template and the plurality of fingerprint enrolment templates, wherein
when the first verification representation is determined to match a first enrolment representation and the determined first verification force parameter is determined to match a first enrolment force parameter comprised in the same fingerprint enrolment template as the first enrolment representation, matching the second verification representation with the first verification representation; and
providing a signal indicating successful authentication of the user based on a degree of deviation of the second verification representation compared to the first verification representation.

6. The method according to claim 5, further comprising the step of:
when a signal indicating unsuccessful authentication of the user is provided, locking the electronic device.

7. The method according to claim 5, further comprising the step of:
when a signal indicating unsuccessful authentication of the user is provided, locking the electronic device, notifying, via electronic communication means, an owner of the electronic device that a spoof is attempting to access the electronic device when it is determined that the object is a spoof finger.

8. The method according to claim 5, further comprising the step of:
when a signal is provided indicating successful authentication of the user, unlocking the electronic device.

9. The method according to claim 5, wherein the step of performing a fingerprint authentication procedure based on the first verification template and the plurality of fingerprint enrolment templates comprises:
matching the first verification force parameter with the plurality of fingerprint enrolment templates, wherein
when said first verification force parameter matches a first enrolment force parameter of said fingerprint enrolment templates, matching the first verification representation with the enrolment representations of the fingerprint enrolment templates comprising the first enrolment force parameter.

10. A method for authenticating a user of an electronic device comprising a fingerprint sensor and a force sensor, said method comprising the steps of:
retrieving a stored plurality of fingerprint enrolment templates of a user's finger, each fingerprint enrolment template comprising a enrolment representation of at least part of the user's finger and a corresponding enrolment force parameter indicative of the force applied by the user's finger when said enrolment representation was acquired;
acquiring, using the fingerprint sensor, a first verification image of an object;
determining a first verification representation from said first verification image;
determining, using the force sensor, a first verification force parameter indicative of a force applied by the object on the fingerprint sensor when the first verification representation is acquired, wherein the first verification representation and the first verification force parameter forms a first verification template;
acquiring, using the fingerprint sensor, a second verification image of the object when a second force is applied by the object on the fingerprint sensor;
determining a second verification representation from said second verification image;
determining, using the force sensor, a second verification force parameter indicative of said second force applied by the object on the fingerprint sensor when the second verification image is acquired, wherein the second verification representation and the second verification force parameter forms a second verification template;
performing a fingerprint authentication procedure based on the first verification template, the second verification template, and the plurality of fingerprint enrolment templates, wherein
when the first verification representation and the first verification parameter comprised in the first verification template matches a respective enrolment representation and enrolment force parameter comprised in the same first fingerprint enrolment template, matching the second verification template with the plurality of fingerprint enrolment templates, and
when the second verification representation and the second verification parameter comprised in the second verification template matches a respective second enrolment representation and second enrolment force parameter comprised in the same second fingerprint enrolment template, providing a signal indicating successful authentication of the user.

11. The method according to claim 10, further comprising the step of:

when a signal indicating unsuccessful authentication of the user is provided, locking the electronic device.

12. The method according to claim 10, further comprising the step of:
when a signal indicating unsuccessful authentication of the user is provided, locking the electronic device, notifying, via electronic communication means, an owner of the electronic device that a spoof is attempting to access the electronic device when it is determined that the object is a spoof finger.

13. The method according to claim 10, further comprising the step of:
when a signal is provided indicating successful authentication of the user, unlocking the electronic device.

14. An electronic device, comprising:
a control unit; and
a fingerprint sensing system comprising a force sensor and a fingerprint sensor, wherein the control unit is configured to:
retrieve a stored plurality of fingerprint enrolment templates of a user's finger, each fingerprint enrolment template comprising a enrolment representation of at least part of the user's finger and a corresponding enrolment force parameter indicative of the force applied by the user's finger when said enrolment representation was acquired;
acquire, using the fingerprint sensor, a first verification image of an object;
determine a first verification representation from said first verification image;
determine, using the force sensor, a first verification force parameter indicative of a force applied by the object on the fingerprint sensor when the first verification representation is acquired, wherein the first verification representation and the first verification force parameter forms a first verification template;
perform a fingerprint authentication procedure based on the first verification template and the plurality of fingerprint enrolment templates, wherein
when each of the first verification representation and the first verification force parameter comprised in the verification template matches a respective enrolment representation and enrolment force parameter comprised in the same fingerprint enrolment template, providing a signal indicating successful authentication of the user,
wherein the control unit is further configured to, when a match is found between the first verification representation and a first enrolment representation,
compare the first verification force parameter and the first enrolment force parameter stored in the fingerprint enrolment template comprising the matching first enrolment representation, wherein,
when the first verification force parameter is determined to not match the first enrolment force parameter, lock the electronic device so that the electronic device can not be accessed.

15. The electronic device according to claim 14, wherein the control unit is configured to notify, via electronic communication means, the owner of the electronic device that a spoof is attempting to access the electronic device when the electronic device is being locked.

16. The electronic device according to claim 14, wherein the control unit is configured to unlock the electronic device in response to said signal indicating successful authentication of the user.

17. The electronic device according to claim 14, wherein the fingerprint sensor is a capacitive fingerprint sensor.

18. The electronic device according to claim 14, wherein the electronic device is a mobile phone.

* * * * *